(12) United States Patent
Mehrotra et al.

(10) Patent No.: US 8,631,362 B1
(45) Date of Patent: Jan. 14, 2014

(54) CIRCUIT INSTANCE VARIATION PROBABILITY SYSTEM AND METHOD

(71) Applicant: Berkeley Design Automation, Santa Clara, CA (US)

(72) Inventors: Amit Mehrotra, Mountain View, CA (US); Abhishek Somani, Calcutta (IN); Kurt Johnson, Albuquerque, NM (US); Paul Estrada, Los Altos, CA (US)

(73) Assignee: Berkeley Design Automation, Inc., Santa Clara, CA (US)

( * ) Notice: Subject to any disclaimer, the term of this patent is extended or adjusted under 35 U.S.C. 154(b) by 0 days.

(21) Appl. No.: 13/776,598

(22) Filed: Feb. 25, 2013

Related U.S. Application Data

(60) Provisional application No. 61/714,071, filed on Oct. 15, 2012.

(51) Int. Cl.
*G06F 17/50* (2006.01)

(52) U.S. Cl.
USPC .............. 716/54; 716/110; 716/132; 716/136

(58) Field of Classification Search
USPC ..................... 716/54, 110, 132, 136
See application file for complete search history.

(56) References Cited

U.S. PATENT DOCUMENTS

| | | | |
|---|---|---|---|
| 7,676,351 B2 * | 3/2010 | Jandhyala et al. ................. 703/2 |
| 8,271,256 B2 * | 9/2012 | Khalily et al. ................... 703/14 |
| 2007/0234252 A1 * | 10/2007 | Visweswariah et al. .......... 716/6 |
| 2007/0250797 A1 * | 10/2007 | Engel et al. ........................ 716/2 |
| 2010/0293512 A1 * | 11/2010 | Buck et al. ........................ 716/2 |
| 2010/0332206 A1 * | 12/2010 | Leu .................................. 703/14 |

* cited by examiner

*Primary Examiner* — Stacy Whitmore
(74) *Attorney, Agent, or Firm* — Fenwick & West LLP

(57) ABSTRACT

A system and process for utilizing probability distribution information about process parameters to quantify the probability of manufacturing process variation for variants of circuit designs in order to more efficiently analyze and simulate the designs.

19 Claims, 5 Drawing Sheets

CIRCUIT INSTANCE VARIATION PROBABILITY SYSTEM AND METHOD

RELATED APPLICATION

This application claims priority to U.S. provisional application 61/714,071 which is incorporated by reference herein in its entirety.

BACKGROUND

It is impractical if not impossible to accurately and completely characterize integrated circuit designs to ensure the resulting manufactured circuit will meet all of its design specifications under all possible manufacturing process variations. Instead designers need to tradeoff the time and expense of incremental additional characterization, the cost of delaying manufacturing, and the parametric yield risk of a percentage of manufactured circuits not meeting all specifications. Today they do so qualitatively rather than quantitatively.

SUMMARY

A computer based method for quantifying the probability of process variation vectors prior to and in conjunction with circuit simulation. The invention computes the probability of process variation vectors composed of either all or a subset of process parameters that are deterministically or randomly selected and stores the result, where the probability of each individual process parameter is based on foundry supplied distribution information.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

A preferred embodiment of the present invention is now described with reference to the figures where like reference numbers indicate identical or functionally similar elements. Also in the figures, the left most digits of each reference number corresponds to the figure in which the reference number is first used.

Figure 1:
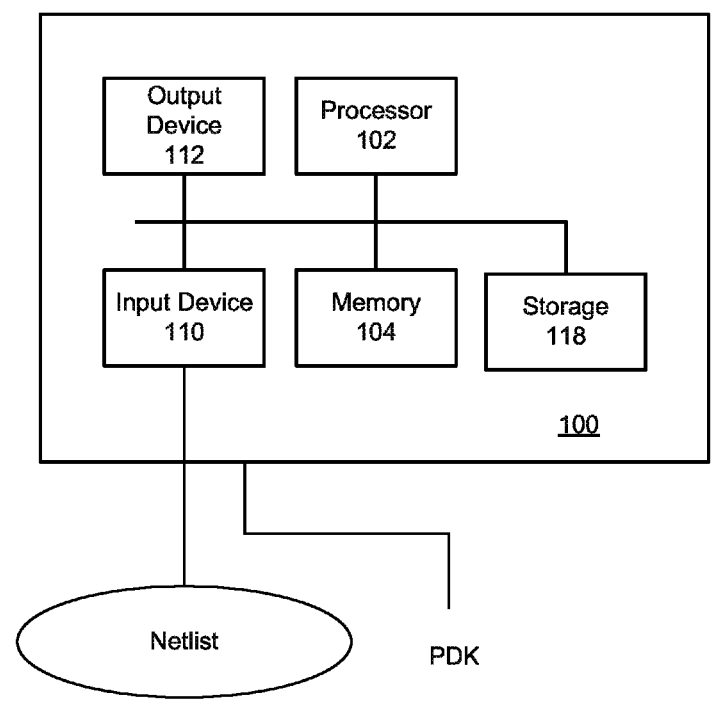
FIG. 1 is a functional block diagram of a computer system in which some embodiments may operate.

FIG. 1 is a functional block diagram of a computer system in which some embodiments may operate. A computing device 100 may include a processor 102, a memory 104, an input device 110, an output device 112, and a storage device 118.

Processor 102 may include one or more conventional processors that interpret and execute instructions stored in a tangible medium, such as memory 104, or storage device 118 which can be a media card, flash RAM, or other tangible medium. As described herein, memory 104 may include random access memory (RAM) or another type of dynamic storage device, and read-only memory (ROM) or another type of static storage device, for storing this information and instructions for execution by processor 102. The RAM, or another type of dynamic storage device, may store instructions as well as temporary variables or other intermediate information used during execution of instructions by processor 102. The ROM, or another type of static storage device, may store static information and instructions for processor 102.

Input device 110 may include hard keys and/or soft keys, a microphone, a touch screen, and/or other input devices. Output device 112 may include a speaker and/or a display. The input device 110 and/or output device 112 can provide data and signal transfer functionality in a variety of ways. For example, data transfer can be performed using wired communication or wireless communication without departing from the scope of the embodiments.

In an embodiment, a netlist is received by the computing device 100. A netlist is a description of the connectivity and devices/instances of an electronic design. Electronic designs are ultimately manufactured using a fabrication process, often by one or more foundries. Each foundry has different fabrication processes and these different processes can be accounted for during simulation of the electronic design, e.g., an integrated circuit design. Foundries provide a process design kit (PDK) that includes process parameters (PPs) representing manufacturing-related values that vary from die-to-die across a wafer and between wafers. The foundry updates their PDK with new process parameter values as the fabrication process changes and matures. In the PDK each process parameter includes a probability distribution representing what the foundry believes is a realistic distribution for the particular process parameter. Designers do not generally consider the process parameter probability distribution when determining which conditions to simulate. Embodiments herein more efficiently simulate circuit designs by more accurately considering the manufacturing variations, e.g., the characterization space, when simulating the circuit design.

Figure 2:
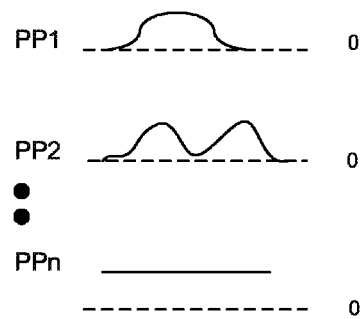
FIG. 2 is an illustration of process parameters and associated probability distributions in accordance with an embodiment.

FIG. 2 is an illustration of process parameters and associated probability distribution in accordance with an embodiment. Process parameters (e.g., oxide thickness, junction capacitance, saturation voltage, gate capacitance, and sheet resistance) represent manufacturing-related values that vary from die-to-die. Each process parameter (PP1 ... PPn) has an associated probability distribution representing the distribution of the probability parameter. For example, as shown in FIG. 2, PP1 has a probability distribution that is similar to a normal distribution. PP2 has a bi-modal distribution. PPn has a uniform distribution. These process parameters are often provided by manufacturers and can be updated based on continuing testing of manufactured wafers. A designer can intentionally or unknowingly simulate a design using an extreme value of a multiple number of the N process parameters. The likelihood of such a combination of process parameters occurring in the manufacturing process may be arbitrarily small; however, without quantification of the probability, designers do not know the likelihood of any given set of process parameters.

A conventional approach for characterizing circuits relative to silicon manufacturing process variation is to use standard process corners defined in a PDK, where a process corner is a process parameter vector with a set of values that collectively represent an extreme "corner" of the process. However PDK process corners are typically not well correlated with extremes in circuit-specific measurements based on realistic process variation. Therefore, PDK process corners provide an inadequate basis for analyzing how the circuit will behave in silicon.

In order to more accurately characterize circuits, designers may use statistical approaches—most notably process Monte Carlo simulation (hereafter "process Monte Carlo"). There are many possible variants of process Monte Carlo. Standard process Monte Carlo simulates a user-specified number of iterations (e.g., 100) known as "the sample" each iteration of which has a different process parameter vector which is comprised of a pseudo-randomly selected value for each process parameter, where the total population of each process parameter's values for the sample approximates that process parameter's probability density function as specified in the PDK.

Figure 3:
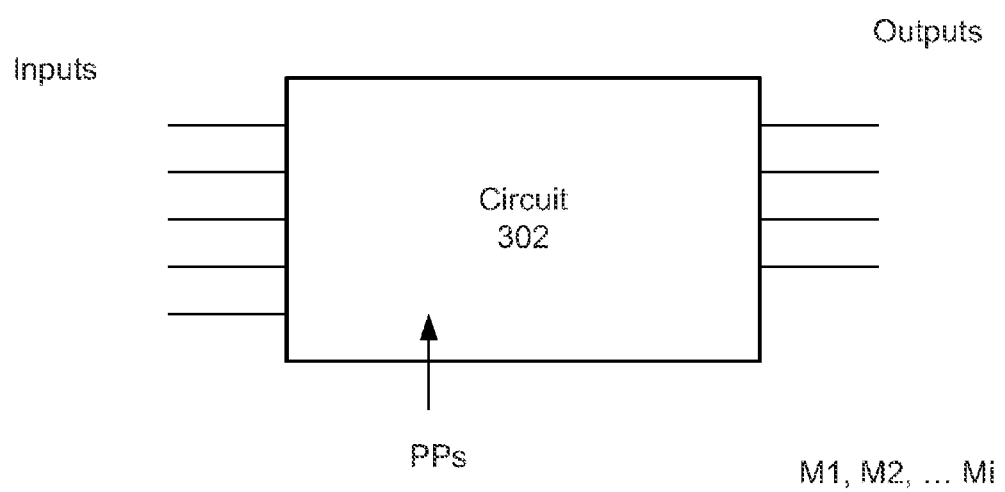
FIG. 3 is an illustration of a circuit that represents simulation inputs and measurements in accordance with an embodiment.

FIG. 3 is an illustration of a circuit with simulation inputs and outputs in accordance with an embodiment. A circuit simulator, e.g., a computer program stored in memory 104, reads the inputs and computes time-based or frequency-based outputs. The process parameter values (PPs) effect how the devices within the circuit respond to possible set of local process conditions and, thus, cumulatively affect the circuit's output. Circuit measurements (M1 . . . Mi) may be computed in real-time during the simulation or computed after the simulation based on the simulation outputs, as well as internal circuit nodes. Measurements typically include the circuit's performance specifications (e.g., gain, signal-to-noise ratio, and jitter) and may also include additional measurements that are useful for designers to understand the circuit behavior (e.g., for debug purposes).

Figure 4:
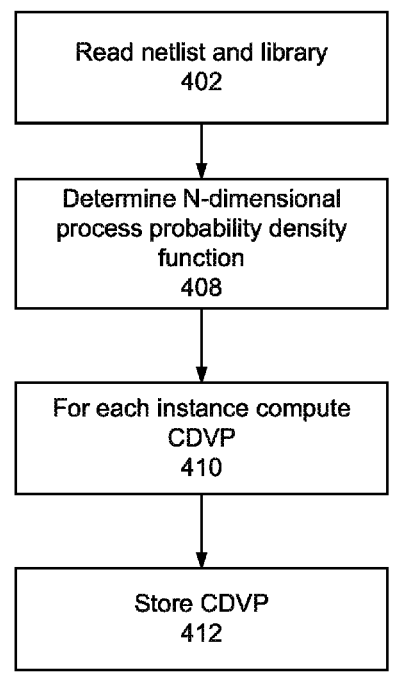
FIG. 4 is a flowchart of a method in accordance with an embodiment.

FIG. 4 is a flowchart of a method in accordance with an embodiment. The system reads 402 a netlist, the PDK, an optional specified process parameter list, a set of netlist variants, and an optional absolute reference. The list of netlist variants can also be referred to as a netlist variant vector. A subset of the netlist vector is a set of values for process parameters, a process parameter vector and can include all process parameters or a subset thereof. If subset of process parameters is used this can also be referred to as an optional specified process parameter (SPP) list specifies a subset of process parameters to use for the probability computation; SPP defaults to all process parameters if no list is specified. The optional specified process parameter list (SPPs) defines a subset of the process parameters to use for the probability computation. Many circuits are relatively insensitive to many process parameters; thus a realistic probability can be based only on those process parameters that have a significant contribution to the measure (i.e., the SPPs). The netlist variants (hereafter "variant") are versions of the netlist with deterministic or statistical process parameter values for which a process probability is to be computed. Variants may include—but are not limited to—process corners, sweep points, Monte Carlo iterations, or any nested combination of the preceding (e.g., a Monte Carlo iteration from a sweep point at a process corner). The netlist variants may be in a netlist or database format. The optional absolute reference may be specified as a set of process parameters in netlist form that are the absolute reference for the probability computation.

The system determines 408 the N-dimensional process probability density function (PPDF) using theoretical or numerical methods, where theoretical methods mathematically precisely solve for the PPDF and numerical methods do so statistically by generating a suitably large sample of process parameter vectors. The system computes the relative circuit variant process probability (CVPP) for each specified netlist variant vector, process parameter vector and/or SPP vector, where the CVPP is a function of the Euclidean distance of the variant's process parameter (PP), such as an optional SPP, relative to the PPDF. If an optional absolute reference is specified, the system also computes the absolute CVPP as a function of the distance of the variant's PP, such as an optional SPP, relative to the absolute reference and the PPDF. The system stores the relative and optional absolute CVPP for each PP, such as an optional SPP, for use in reporting or characterization.

Figure 5:
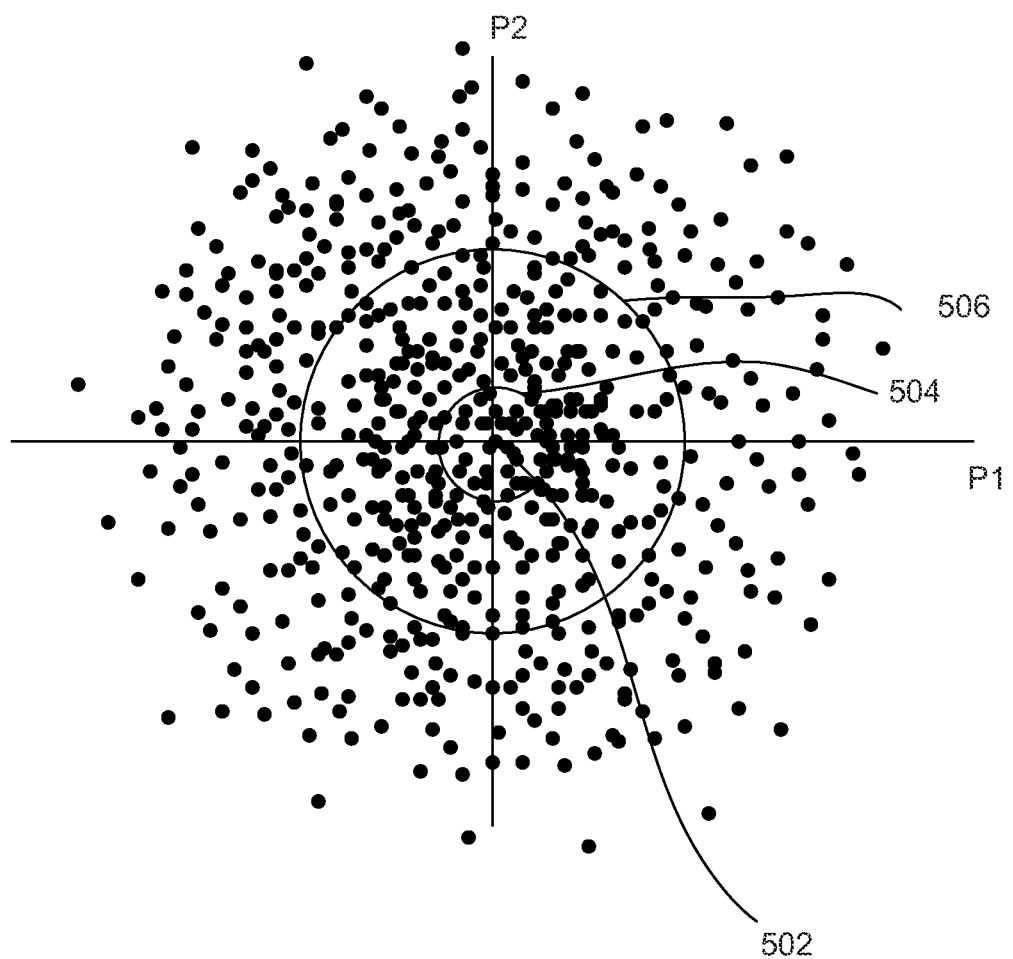
FIG. 5 is an illustration describing one manner in which the circuit instance variation probability can be used.

FIG. 5 is an illustration of one possible computation method. For ease of discussion FIG. 5 illustrates a mapping of a two-dimensional process parameter vector that includes process parameters P1 and P2. It is understood that embodiments do not need to generate a map similar to FIG. 5; instead the map is used herein to more effectively describe an example. In FIG. 5, the each set of process parameter vectors is shown as a dot. The mean of the collection of process parameter vectors is point 502. A process parameter vector's probability is a function of its dot's distance from the mean relative to all other dots. If the process parameter vectors outside circle 504 are 90% of all process parameter vectors, then 504 represents a distance at which a process parameter vector has 90% probability of occurring (relative to the overall sample). Similarly if the process parameter vectors outside circle 506 are 70% of all process parameter vectors, then 504 represents a distance at which a process parameter vector has 70% probability of occurring (relative to the overall sample). Thus using this PPF as a scale, one can determine the probability of any existing or new variant with unique P1 and P2 values by comparing its distance relative to the PPF (i.e., relative to the existing population).

Designers can then chose process parameter vectors to simulate based upon particular criteria related to the relative distance/ordering of the process parameter vectors. For example, if a designer wants to simulate the most commonly occurring process parameter vectors, then those closest to the mean can be selected. If a designer wants a mixture, then process parameter vectors in a variety of percentiles can be used, e.g., process parameters from each decile can be selected. A designer may want to simulate unusual situations in which case the simulation can run using process parameter vectors that are extreme, e.g., closest to a three sigma variation, or a process parameter vector whose distance is larger than approximately 99% of all process parameter vectors. The ability to select process parameter vectors based on the relative likelihood of such a process parameter vector occurring when compared to all process parameter vectors can significantly reduce the number of simulations that need to execute since particular likelihoods are used as a basis for selecting inputs into a simulation.

The circuit instance variation probability and underlying data can be stored 412 in memory 104 or a storage device 118 for example. This enables the circuit instance variation probability data to be available to use later in the development/simulation process. The storing 412 can be temporary, e.g., in a register, for use in a short term and/or the storing 412 can be in a non-transitory memory.

An example of such later uses is as a constraint or directive for any characterization simulation (e.g., a set of corners, sweep points, Monte Carlo simulations, or nesting of the preceding). In this use the designer can specify probability ranges of interest and the simulator will automatically simulate only variants within those ranges. For example, a designer may be interested in simulating only high probability or only low probability variants. Another option would be to specify that the simulator should simulate the variants in ascending or descending relative or absolute probability order.

Another use is to create a static report that lists the relative and optional absolute CVPP for any netlist variant that including corners, sweeps, Monte Carlo, and nestings of the previous. Designers can use this list to assess relative value of possible simulations and to select and order subsets of the variants to simulate. Scripts or third-party tools could also use such a report to assess variant probability.

Another use of CVPP is a distribution analysis graphical user interface to interactively display information about the distribution including probability distributions. The CVPP can be included in an interactive, graphic distribution analyzer that can include the ability to display CVPP, change colors and/or shapes based on CVPP, filter and/or sort based on CVPP, specify and control simulation runs via CVPP, etc. Another use of CVPP is enhanced results processing which can include simulation results with probability information superimposed, e.g., colors can be used to represent data resulting from simulations with process parameters vectors in different quarters (e.g., top 25%), deciles, etc.

Another use of CVPP is statistical corner analyzer which identifies the likelihood of process corners set forth in a PDK based upon the CVPP determination. An example of a statistical corner analyzer is described in U.S. provisional application 61/714,071 which is incorporated by reference herein in its entirety.

Another use of CVPP is in a design of experiments. Instead of a user requesting specific orders, ranges etc, the CVPP can be used either alone or in combination with other factors such as sensitivity, circuit measurements, etc., to automatically generate and simulate a design-of-experiments (DOE). For example, a DOE can be generated in which process probability vectors having a wide range of relative distances can be used as inputs to the simulations, or any other process parameter vector selection criteria can be used.

Another use of CVPP is to perform enhanced analyses in which CIPV can be used in combination with related analysis such as process sensitivity and mismatch contribution analysis, including in combination with other relevant factors.

Another use of CVPP is performing circuit optimization in which CVPP can be used to direct circuit optimization along with other relevant factors such as circuit parameter constraints and circuit measurement goals.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A computer based method for quantifying the probability of a circuit design variant comprising:
    receiving a circuit netlist related to the circuit design variant;
    identifying a process parameter vector from said circuit netlist, comprising a set of manufacturing process parameters, wherein each process parameter has an associated process parameter distribution;
    determining by the computer a process probability distribution function based upon the process parameter distribution;
    determining a circuit design variant probability for the circuit design variant based on the process probability distribution function;
    storing said circuit design variant probability information.

2. The computer based method of claim 1, wherein said step of determining a process probability distribution function uses a process Monte Carlo.

3. The computer based method of claim 1, wherein said step determining the circuit design variant probability is one of a relative probability and an absolute probability.

4. The computer based method of claim 3, wherein the likelihood of each process probability distribution function occurring is determined using said the associated process parameter distributions.

5. The computer based method of claim 4, wherein said process parameter vector includes one or more process parameters from said circuit netlist.

6. The computer based method of claim 4, wherein said step of generating a circuit design variant probability comprises:
    determining a value for a selected process parameter vector representing a distance of said selected process parameter vector from a central value of said process probability distribution function.

7. The computer based method of claim 1, wherein said step determining the circuit design variant probability is one of a relative probability and an absolute probability.

8. The computer based method of claim 1, wherein the likelihood of each process probability distribution function occurring is determined using said the associated process parameter distributions.

9. The computer based method of claim 1, wherein said process parameter vector includes one or more process parameters from said circuit netlist.

10. The computer based method of claim 1, wherein said step of generating a circuit design variant probability comprises:
    determining a value for a selected process parameter vector representing a distance of said selected process parameter vector from a central value of said process probability distribution function.

11. The computer based method of claim 10, wherein said distance is determined using Euclidean distance.

12. The computer based method of claim 10, wherein said central value is the mean of said process probability distribution function.

13. A non-transitory computer readable medium comprising instructions which when executed by a processor perform the steps of:
    receiving a circuit netlist related to a circuit design variant;
    identifying a process parameter vector from said circuit netlist, comprising a set of manufacturing process parameters, wherein each process parameter has an associated process parameter distribution;
    determining a process probability distribution function based upon the process parameter distribution;
    determining a circuit design variant probability for the circuit design variant based on the process probability distribution function;
    storing said circuit design variant probability information.

14. The non-transitory computer readable medium of claim 13, wherein said step of determining a process probability distribution function uses a process Monte Carlo.

15. The non-transitory computer readable medium of claim 13, wherein said step determining the circuit design variant probability is one of a relative probability and an absolute probability.

16. The non-transitory computer readable medium of claim 13, wherein the likelihood of each process probability distribution function occurring is determined using said the associated process parameter distributions.

17. The non-transitory computer readable medium of claim 13, wherein said process parameter vector includes one or more process parameters from said circuit netlist.

18. The non-transitory computer readable medium of claim 13, wherein said step of generating a circuit design variant probability comprises:
    determining a value for a selected process parameter vector representing a distance of said selected process parameter vector from a central value of said process probability distribution function.

19. The non-transitory computer readable medium of claim 13, wherein said step determining the circuit design variant probability is one of a relative probability and an absolute probability.

* * * * *